United States Patent
Wang et al.

(10) Patent No.: US 10,866,667 B2
(45) Date of Patent: Dec. 15, 2020

(54) TOUCH PRESSURE CONTROL METHOD AND DEVICE

(71) Applicant: GOERTEK INC., Weifang (CN)

(72) Inventors: Wentao Wang, Weifang (CN); Tianduo Zhou, Weifang (CN); Zhongkai Li, Weifang (CN)

(73) Assignee: Weifang Goertek Microelectronics Co., Ltd., Shandong (CN)

( * ) Notice: Subject to any disclaimer, the term of this patent is extended or adjusted under 35 U.S.C. 154(b) by 0 days.

(21) Appl. No.: 16/320,722

(22) PCT Filed: Dec. 19, 2016

(86) PCT No.: PCT/CN2016/110698
§ 371 (c)(1),
(2) Date: Jan. 25, 2019

(87) PCT Pub. No.: WO2018/023921
PCT Pub. Date: Feb. 8, 2018

(65) Prior Publication Data
US 2019/0163308 A1    May 30, 2019

(30) Foreign Application Priority Data
Aug. 5, 2016 (CN) .......................... 2016 1 0640948

(51) Int. Cl.
*G06F 3/041* (2006.01)
*G06F 3/0354* (2013.01)
*G06F 3/0488* (2013.01)

(52) U.S. Cl.
CPC ........ *G06F 3/0412* (2013.01); *G06F 3/03547* (2013.01); *G06F 3/0414* (2013.01);
(Continued)

(58) Field of Classification Search
CPC .... G06F 3/0412; G06F 3/0414; G06F 3/0416; G06F 3/0488; G06F 3/04886;
(Continued)

(56) References Cited

U.S. PATENT DOCUMENTS

| 5,241,308 A * | 8/1993 | Young | G06F 3/0414 341/22 |
| 9,141,225 B2 * | 9/2015 | Cok | G06F 3/044 |

(Continued)

FOREIGN PATENT DOCUMENTS

| CN | 103019427 A | 4/2013 |
| CN | 103513882 A | 1/2014 |

(Continued)

*Primary Examiner* — Vijay Shankar
(74) *Attorney, Agent, or Firm* — Saliwanchik, Lloyd & Eisenschenk (57) ABSTRACT

A touch pressure control method and device are provided. The touch pressure control method comprises: determining, according to a first pressure value and a second pressure value generated in response to a single touch operation, a pressure level and a touch point position corresponding to the touch operation; and selecting, according to the pressure level and the touch point position, a corresponding function or application from a function and application list, and controlling an implementation of the function or application.

8 Claims, 3 Drawing Sheets

(52) U.S. Cl.
CPC .......... *G06F 3/0416* (2013.01); *G06F 3/0488*
(2013.01); *G06F 2203/0339* (2013.01)

(58) Field of Classification Search
CPC ............. G06F 3/04883; G06F 3/03547; G06F 3/0202; G06F 2203/0339
See application file for complete search history.

(56) References Cited

U.S. PATENT DOCUMENTS

| | | | |
|---|---|---|---|
| 9,436,379 | B2 | 9/2016 | Gan |
| 9,619,084 | B2* | 4/2017 | Deichmann ............ G06F 3/0421 |
| 10,175,786 | B2* | 1/2019 | Zhang ................... G06F 3/0488 |
| 2008/0085749 | A1* | 4/2008 | Kaji ......................... A63F 1/02 463/11 |
| 2017/0205937 | A1* | 7/2017 | Zhang ..................... G06F 3/041 |

FOREIGN PATENT DOCUMENTS

| | | | |
|---|---|---|---|
| CN | 105094610 A | 11/2015 |
| CN | 105183319 A | 12/2015 |
| CN | 105607775 A | 5/2016 |
| CN | 105653168 A | 6/2016 |
| EP | 2990913 A1 | 3/2016 |

* cited by examiner

TOUCH PRESSURE CONTROL METHOD AND DEVICE

CROSS REFERENCE TO RELATED APPLICATIONS

This application is a National Stage of International Application No. PCT/CN2016/110698, filed on Dec. 19, 2016, which claims priority to Chinese Patent Application No. 201610640948.2, filed on Aug. 5, 2016, both of which are hereby incorporated by reference in their entireties.

TECHNICAL FIELD

The present disclosure relates to the field of touch control technology and in particular to a touch pressure control method and device.

BACKGROUND

It is a very common and mature technology to control a device to perform a function or an application by operating a key, for example, powering on a computer by operating a power key of a computer, adjusting a volume by operating a side key of a mobile phone, etc. However, a traditional mechanical key has disadvantages of loud noise, limited service life, easy occurrence of poor contact, poor manipulation experience and the like, and is not attractive in appearance and difficult to clean because of a protruding appearance design. Therefore, smart touch keys, which serve as an alternative solution of the traditional mechanical key, are increasingly applied in a variety of devices to achieve controls, which may not only improve the reliability, but also contribute to achieving complete sealing and a modern design.

However, the inventors have found that the touch keys currently available on the market solve some of the defects of the conventional keys, but are relatively simple in function. In order to achieve a plurality of functions through the touch keys, it is necessary to design a plurality of keys or integrate different parts, accompanied with more occupied space and poor user experience.

Therefore, the inventors consider that it is necessary to solve the problems existing in the prior art.

SUMMARY

An objective of the present disclosure is to provide a new technical solution for touch pressure control.

According to a first aspect of the present disclosure, there is provided a touch pressure control method, comprising the following steps: according to a first pressure value and a second pressure value generated in response to a single touch operation, determining a pressure level and a touch point position corresponding to the touch operation; and according to the pressure level and the touch point position, selecting a corresponding function or application from a function and application list, and controlling an implementation of the function or application.

In one embodiment, the step of according to the first pressure value and the second pressure value generated in response to the touch operation, determining the pressure level and the touch point position corresponding to the touch operation comprises: according to a sum of the first pressure value and the second pressure value, determining the pressure level corresponding to the touch operation; and according to a ratio of the first pressure value to the second pressure value, determining the touch point position corresponding to the touch operation.

Optionally, the touch pressure control method further comprises: when determining the pressure level and the touch point position corresponding to the touch operation, further determining a pressure duration corresponding to the touch operation; and according to the pressure level, the touch point position and the pressure duration, selecting the corresponding function or application from the function and application list, and controlling the implementation of the function or application.

Optionally, the touch pressure control method comprises: resetting the function and application list in response to an external setting request.

Optionally, the touch pressure control method comprises: acquiring the first pressure value generated in response to the touch operation by a first pressure sensor and the second pressure value generated in response to the touch operation by a second pressure sensor.

According to a second aspect of the present disclosure, there is provided a touch pressure control device which comprises: a parameter determination unit configured to according to a first pressure value and a second pressure value generated in response to a single touch operation, determine a pressure level and a touch point position corresponding to the touch operation; and a function control unit configured to according to the pressure level and the touch point position, select a corresponding function or application from a function and application list, and control an implementation of the function or application.

In one embodiment, the parameter determination unit at least comprises: a means configured to according to a sum of the first pressure value and the second pressure value, determine the pressure level corresponding to the touch operation; and a means configured to according to a ratio of the first pressure value to the second pressure value, determine the touch point position corresponding to the touch operation.

Optionally, in the touch pressure control device, the parameter determination unit further comprises a means configured to determine a pressure duration corresponding to the touch operation; and the function control unit are configured to according to the pressure level, the touch point position and the pressure duration, select the corresponding function or application from the function and application list, and control the implementation of the function or application.

Optionally, the touch pressure control device further comprises: a means configured to reset the function and application list in response to an external setting request.

Optionally, the touch pressure control device further comprises: a means configured to acquire the first pressure value generated in response to the touch operation by a first pressure sensor and the second pressure value generated in response to the touch operation by a second pressure sensor.

The inventors of the present disclosure have found that in the prior art, there has not been proposed a touch pressure control method and device that implement a plurality of functions by a single key and occupy less space. Therefore, the technical task to be achieved by the present disclosure or the technical problem to be solved by the present disclosure may not be conceived or expected by those skilled in the art, so the present disclosure is a new technical solution.

Further features of the present disclosure and advantages thereof will become apparent from the following detailed description of exemplary embodiments according to the present disclosure with reference to the attached drawings.

BRIEF DESCRIPTION OF THE DRAWINGS

The accompanying drawings, which are incorporated in and constitute a part of the specification, illustrate embodiments of the disclosure and, together with the description thereof, serve to explain the principles of the disclosure.

DETAILED DESCRIPTION

Various exemplary embodiments of the present disclosure will now be described in detail with reference to the drawings. It should be noted that the relative arrangement of the components and steps, the numerical expressions, and numerical values set forth in these embodiments do not limit the scope of the present disclosure unless it is specifically stated otherwise.

The following description of at least one exemplary embodiment is merely illustrative in nature and is in no way intended to limit the disclosure, its application, or uses.

Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed for following figures.

<Hardware Configuration>

Figure 1:
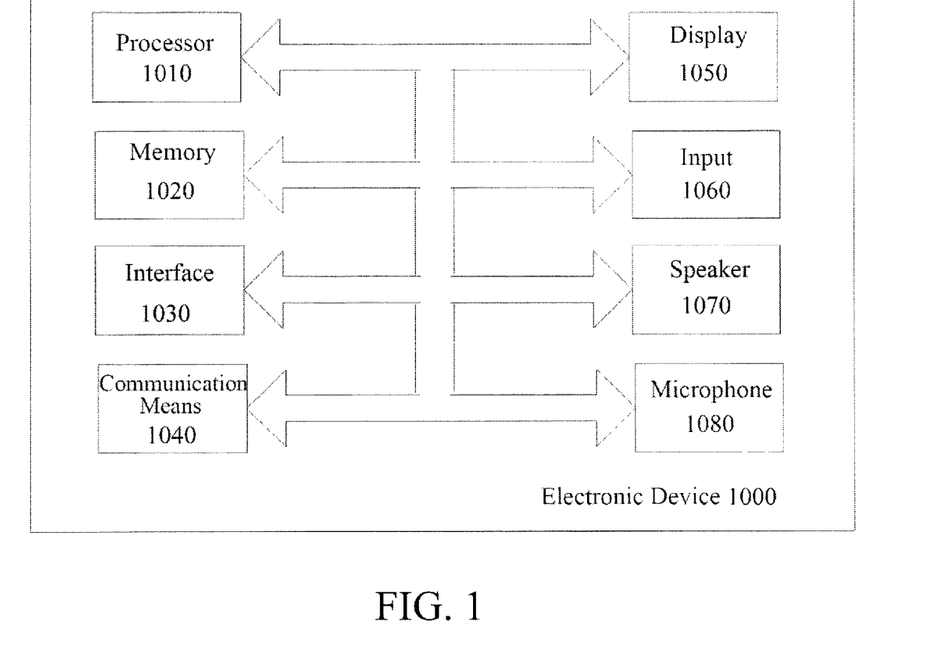
FIG. 1 is a block diagram showing an example of a hardware configuration of a device that can be used to implement an embodiment of the present disclosure.

FIG. 1 shows a hardware configuration of a device 1000 that can be used to implement an embodiment of the present disclosure. The device 1000 may include a processor 1010, a memory 1020, an interface means 1030, a communication means 1040, a display means 1050, an input means 1060, a speaker 1070, a microphone 1080 and the like. The processing means 1010 can be a central processing unit CPU, a micro central processing unit MCU or the like. The memory 1020 may include a ROM (Read-only Memory), a RAM (Random-access Memory), a non-volatile memory such as a hard disk, and the like, for example. The interface means 1030 may include a USB interface, a headphone interface and the like, for example. The communication means 1040 can perform wired or wireless communication, for example. The display means 1050 can be a liquid crystal screen, a touch display screen or the like, for example. The input means 1060 may include a touch screen, a keyboard, a key or the like, for example. The user can input/output voice information via the speaker 1070 and the microphone 1080.

Figure 2:
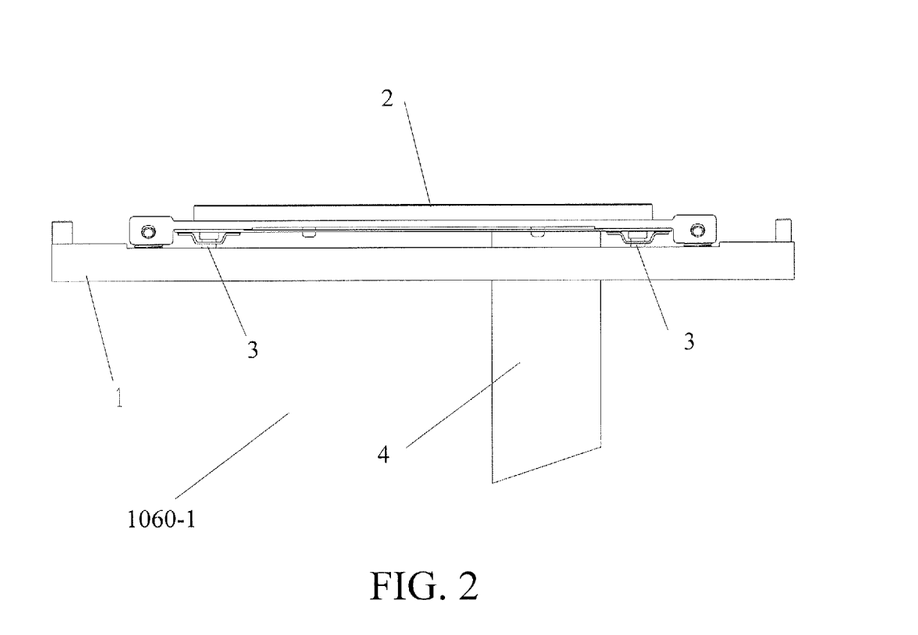
FIG. 2 shows a structural diagram of a key module that can be used to implement the embodiment of the present disclosure.

In an example, the input means 1060 is a key module 1060-1, as shown in FIG. 2. The key module 1060-1 comprises a substrate 1, a touch bar 2, at least two pressure sensors 3, and a circuit board 4. The touch bar 2 is configured to receive a touch operation applied by the outside. The pressure sensor 3 is configured to generate a pressure signal that characterizes a pressing degree of the touch bar 2 according to the touch operation applied to the touch bar 2. The circuit board 4 is configured to transmit the pressure signal generated by the pressure sensor 3 to the processor 1010.

The electronic device shown in FIG. 1 is only illustrative, and is not intended to limit the present disclosure, or its application or use. In the embodiment, the memory 1020 is used to store instructions. The instructions are used to control the processor 1010 to perform the operations for implementing a pressure touch control method provided by an embodiment of the present disclosure. Those skilled in the art should understand that although multiple means are shown in FIG. 1, the present disclosure may only relate to some of them, such as the processor 1010 and the memory 1020. Those skilled in the art can design the instructions according to the solutions disclosed by the present disclosure. How the instructions control the processor to operate belongs to the common sense in the art and will not be described in detail.

Embodiment

The general idea of the present disclosure is to provide a pressure touch control method for achieving a plurality of functions by a single key, which may not only overcome the defects of loud noise, short life and poor use experience of a mechanical key in the prior art, but also overcome the defect of a touch key in the art that keys need to be designed separately or different parts need to be integrated in order to achieve a plurality of functions, thereby saving space occupied by the keys and promoting the user experience.

Figure 3:
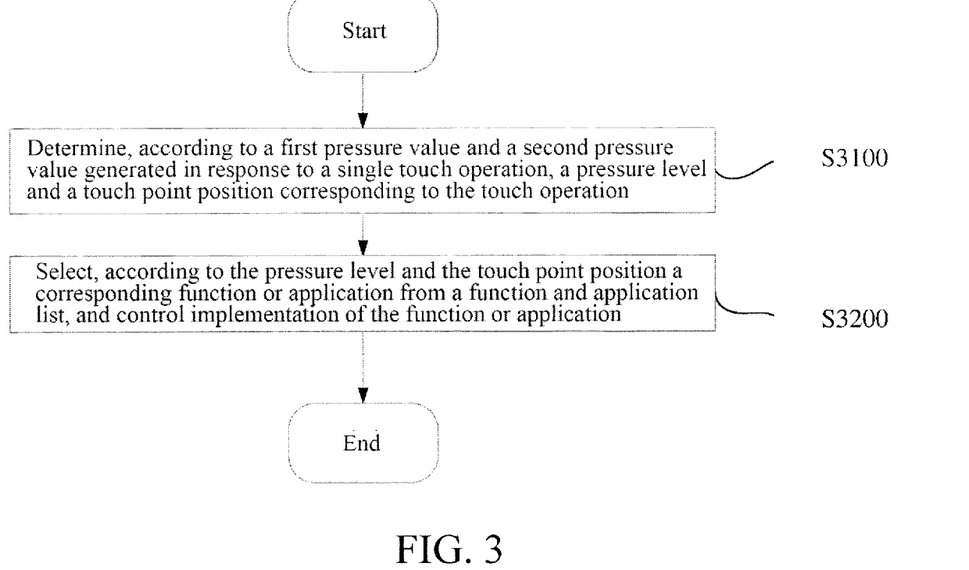
FIG. 3 shows a flowchart of a pressure touch control method provided by the embodiment.

In the embodiment, there is provided a pressure touch control method, as shown in FIG. 3, comprising the following steps.

In step S3100, according to a first pressure value and a second pressure value generated in response to a single touch operation, a pressure level and a touch point position corresponding to the touch operation are determined.

The pressure touch control method provided in the embodiment can be implemented by the key module 1060-1 as shown in FIG. 2, or by a touch key that includes a functional module similar to the key module 1060-1 and is configured to perform a similar function.

When a touch operation is implemented on the key module or the touch key, a pressure will be generated on a contact surface (for example, the touch bar 2 of the key module 1060-1) of the key module. The key module or the touch key generates two pressures, i.e., a first pressure and a second pressure in response to the touch operation. The first pressure value and the second pressure value can be acquired by pressure sensors. In an example, the touch pressure control method in the embodiment further comprises: acquiring, by the first pressure sensor, a first pressure value generated in response to the touch operation; and acquiring, by the second pressure sensor, a second pressure value generated in response to the touch operation. More specifically, taking the key module 1060-1 shown in FIG. 2 as an example, the first pressure value and the second pressure value can be acquired respectively by the two pressure sensors 3 of the key module 1060-1.

The pressure level and the touch point position corresponding to the touch operation can be determined according to the first pressure value and the second pressure value. In an example, the step S3100 includes: determining, according to a sum of the first pressure value and the second pressure value, the pressure level corresponding to the touch operation; and determining, according to a ratio of the first pressure value to the second pressure value, the touch point position corresponding to the touch operation.

Figure 4:
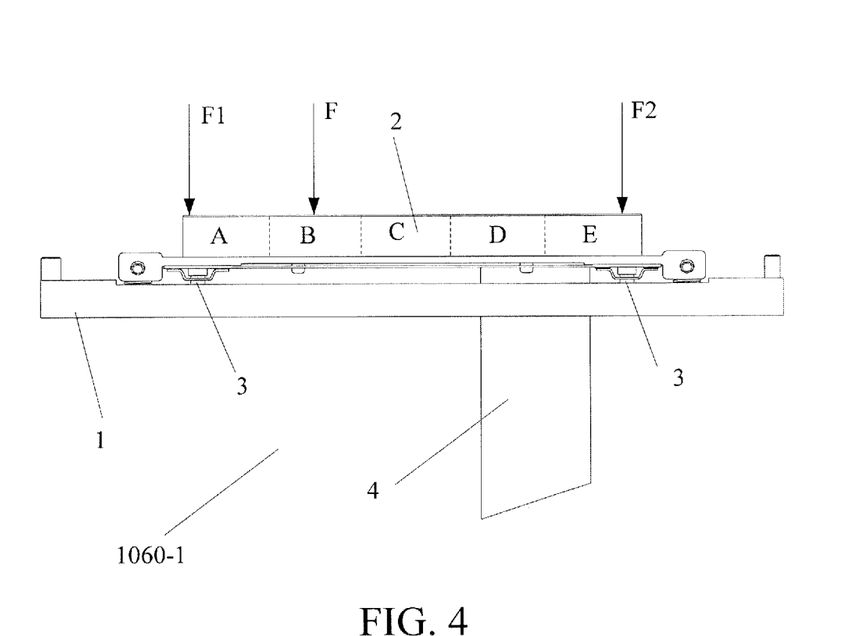
FIG. 4 is a schematic diagram of an example of the pressure touch control method provided by the embodiment.

Taking FIG. 4 as an example, when a touch operation is applied to the key module 1060-1 (which is same as that shown in FIG. 2 and will not be described herein again), the first pressure value acquired by the pressure sensor on the left side is F1, and the second pressure value acquired by the pressure sensor on the right side is F2.

Assuming F=F1+F2, the pressure level corresponding to the touch operation is determined according to the value of F. The pressure level is preset, and can be pre-divided according to a pressure range that the pressure sensor can withstand in a normal linear operation and a pressure range that is generated according to touch pressures collected from a certain sample size of population. For example, the pressure range that the pressure sensor can withstand in the normal linear operation is 0-10 N (N is the pressure unit: Newton). It can be found that the pressure range that is generated according to the touch pressures collected from the certain sample size of population can be divided into two levels: 0-5N for a light press and 5-10N for a heavy press. In order to prevent a false touch (for example, a pressure below 1 N is considered to be no touch), the pressure level can be further defined as: 1-5 N for the light press, and 5-10 N for the heavy press. The pressure level of F is determined according to a specific value of F. The pressure level in the embodiment can be adjusted according to the pressure range that the pressure sensor can withstand and the sample statistics, and can be further subdivided into more pressure levels and different pressure ranges of the pressure levels, which will not be described herein.

The touch point position corresponding to the touch operation is determined according to an actual value of F1/F2. The touch point position is a pre-divided key area, and can be divided according to a lateral length of the key module implemented by the touch operation or user requirements. There can be a plurality of touch point positions. In the actual application process, the touch point positions can also be re-divided according to different user requirements. Each touch point position corresponds to a range of pre-estimated values of F1/F2, that is, a range of ratios of the first pressure values to the second pressure values. A touch point position corresponding to a touch operation can be determined according to a corresponding numerical range within which an actual value of F1/F2 falls.

For example, the touch point positions on the key module 1060-1 can be pre-divided. As shown in FIG. 4, the touch bar on the key module includes five touch point positions: A, B, C, D, and E. Each touch point position corresponds to a numerical range of F1/F2. As shown in FIG. 4, when the actual value of F1/F2 falls within the corresponding numerical range of the touch point position B, it is determined that the touch point position corresponding to the touch operation is the position B.

After the pressure level and the touch point position are determined in step S3100, it proceeds to step S3200. In the step S3200, a corresponding function or application is selected from a function and application list according to the pressure level and the touch point position, and is controlled to be implemented.

The function and application list is used to describe functions or applications corresponding to different pressure levels and touch point positions. The functions refer to functions that are implemented by the corresponding electronic device controlled by the pressure touch control method provided in the embodiment. The applications refer to applications operating on the corresponding electronic device controlled by the pressure touch control method provided in the embodiment.

Taking a mobile phone as an example, a side key of the mobile phone adopts the key module 1060-1 as shown in FIG. 4. The pressure levels are divided into a light press and a heavy press. The touch point positions are A, B, C, D, and E. The corresponding function and application list can be set as in Table 1.

TABLE 1

| Touch point position | Pressure level | Function/application |
|---|---|---|
| A | Light press | Turn up the volume |
|   | Heavy press | Turn down the volume |
| B | Light press | Increase the screen brightness |
|   | Heavy press | Reduce the screen brightness |
| C | Light press | Light up/turn off the screen |
|   | Heavy press | On/Off |
| D | Light press | Answer the phone |
|   | Heavy press | Hang up the phone |
| E | Light press | Open a camera application |
|   | Heavy press | Open a voice recording application |

The function and application list may also be set according to a device that actually implements the touch pressure control method provided in the embodiment. For example, when the implementation device is a car, the touch pressure control method provided in the embodiment is implemented by a start key of the car. A light press at a touch point position can be set to energize a storage battery (such that broadcast music can be received, a window can be adjusted, etc.), and a heavy press can be set to start or shut down the car. For another example, when the implementation device is a toilet bowl, a key of the toilet bowl is provided for implementing the touch pressure control method provided in the embodiment. A light press at a touch point position is set to discharge a small amount of water, and a heavy press can be set to discharge a large amount of water, etc.

In a specific application environment or an application environment, if the function and application list is set to be constant, the requirements of different application scenarios or different users may not be satisfied. Therefore, in an example, the touch pressure control method in the embodiment may further comprise: setting the function and application list in response to an external setting request.

For example, in the above example of the mobile phone, a user wants to quickly open a flashlight application and a mirror application, rather than turning on the camera or the voice recording application. The user may change the touch point position E in the function and application list through an external setting request and sets it as a light press for opening the flashlight application and a heavy press for opening the mirror application.

The above-mentioned preset function and application list has described functions or applications corresponding to different touch point positions and pressure levels. The corresponding function or application is selected from the function and application list according to a touch point position and a pressure level corresponding to a determined touch operation, and is controlled to be implemented. Therefore, a plurality of functions can be implemented by a single key, accompanied with relatively small occupied space and promoted user experience.

In an example, the touch pressure control method provided in the embodiment further comprises: in the step of determining the pressure level and the touch point position corresponding to the touch operation, determining a pressure duration corresponding to the touch operation; and selecting, according to the pressure level, the touch point position and the pressure duration, a corresponding function or application from a function and application list, and controlling the implementation of the function or application.

Continuing with FIG. 4 as an example, the first pressure value F1 and the second pressure value F2 are acquired to determine the pressure level and the touch point position corresponding to the touch operation (the method is as described in the above example, and will not be described herein), while a pressure duration T is further determined. For example, the pressure duration of 0 to 2 seconds can be considered as a time level (a short press), and the pressure duration of greater than 2 seconds can be considered as a time level (a long press). Further, in order to prevent a misoperation, the pressure duration of 1 to 2 seconds can be set as a time level (for example, a misoperation is considered when the pressure duration is within 1 second).

The corresponding function or application can be selected from the function and application list according to the pressure level, the touch point position, and the pressure duration. Correspondingly, such a factor of pressure duration is also added to the function and application list. For example, taking a mobile phone as an example, a side key of the mobile phone adopts the key module 1060-1 as shown in FIG. 4, wherein the pressure level is divided into a light press and a heavy press, the touch point positions are A and B, and the pressure duration is divided into two categories, i.e., 1 to 2 seconds (a short press), and more than 2 seconds (a long press). The corresponding function and application list can be set as shown in Table 2.

TABLE 2

| Touch Point Position | Pressure level | Duration | Function/Application |
| --- | --- | --- | --- |
| A | Light press | 1~2 seconds | Turn up the volume |
|   |   | >2 seconds | Turn down the volume |
|   | Heavy press | 1~2 seconds | Increase the screen brightness |
|   |   | >2 seconds | Reduce the screen brightness |
| B | Light press | 1~2 seconds | Light up/turn off the screen |
|   |   | >2 seconds | On/Off |
|   | Heavy press | 1~2 seconds | Answer the phone |
|   |   | >2 seconds | Hang up the phone |

The above-mentioned function and application list can be correspondingly set according to different implementation devices or different application scenarios. It is also possible to change the settings in response to an external setting request. The method is similar to that described in the foregoing example and will not be described again here.

The corresponding function or application is selected from the function and application list according to the determined touch point position, pressure level, and pressure duration, and is controlled to be implemented. The types of functions implemented on a single key by the touch pressure control method in the embodiment can be further expanded to improve the user experience.

Any of the touch pressure control methods provided in the embodiment can be implemented on various devices having keys, such as a mobile phone, a computer, a TV, a refrigerator, an electric light, a control handle, an air conditioner, a car and an unmanned aerial vehicle, thereby achieving a very broad application field.

Figure 5:
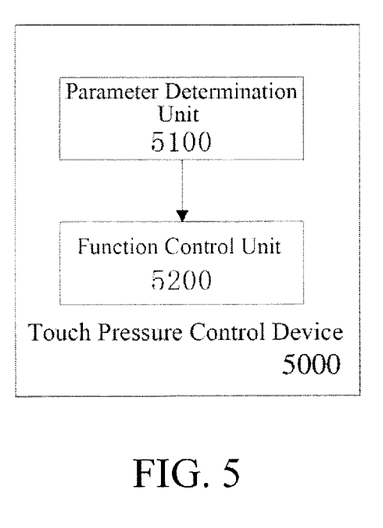
FIG. 5 shows a block diagram of a pressure touch control device provided by the embodiment.

This embodiment further provides a touch pressure control device 5000 which, as shown in FIG. 5, comprises a parameter determination unit 5100 and a function control unit 5200 and is configured to implement any one of the touch pressure control methods provided in the embodiment, which will not be repeated here.

The touch pressure control device 5000 comprises a parameter determination unit 5100 configured to determine, according to a first pressure value and a second pressure value generated in response to a single touch operation, a pressure level and a touch point position corresponding to the touch operation; and a function control unit 5200 configured to select, according to the pressure level and the touch point position, a corresponding function or application from a function and application list, and control the implementation of the function or application.

Preferably, the parameter determination unit 5100 at least comprises: a means configured to determine, according to a sum of the first pressure value and the second pressure value, the pressure level corresponding to the touch operation; and a means configured to determine, according to a ratio of the first pressure value to the second pressure value, the touch point position corresponding to the touch operation.

In an example, in the touch pressure control device 5000, the parameter determination unit 5100 further comprises a means configured to determine a pressure duration corresponding to the touch operation; and the function control unit 5200 configured to select, according to the pressure level, the touch point position and the pressure duration, a corresponding function or application from a function and application list, and control the implementation of the function or application.

Optionally, the touch pressure control device 5000 further comprises a means configured to set the function and application list in response to an external setting request.

Optionally, the touch pressure control device 5000 further comprises a means configured to acquire, by a first pressure sensor, a first pressure value generated in response to the touch operation; and configured to acquire, by a second pressure sensor, a second pressure value generated in response to the touch operation.

In the embodiment, the actual implementation form of the touch pressure control device 5000 is not limited. The touch pressure control device can be separated from a touch input device (for example, the key module shown in FIG. 2 or FIG. 4) and, as an independent function unit, connected to the touch input device to implement any one of the touch pressure control methods provided in the embodiment, or may also be included in the touch input device (for example, the key module shown in FIG. 2 or FIG. 4) to implement any one of the touch pressure control methods provided in the embodiment. The similar functional units or devices that implement any of the touch pressure control methods provided in the embodiment should all fall within the scope of disclosure of the touch pressure control device in the embodiment, as long as they are configured in the same or similar functions.

The embodiments of the present disclosure have been described above with reference to the accompanying drawings. According to this embodiment, there are provided the touch pressure control method and device, which are configured to determine, according to the pressure values generated in response to a single touch operation, a pressure level and a touch point position, select a corresponding function or application from a preset function and application list, and control the implementation of the function or application. Therefore, the defects of the traditional mechanical keys, such as unattractive appearance, short life and poor use experience can be overcome, and a plurality of functions can be achieved with a single key, accompanied with a relatively small occupied space and promoted user experience.

Those skilled in the art shall understand that the touch pressure control device 5000 can be implemented by various ways. For example, the touch pressure control device 5000 can be implemented by configuring a processor using instructions. For example, the instructions can be stored in a ROM, and can be read into a programmable device to realize the touch pressure control device 5000 when the device starts. For example, the touch pressure control device 5000 can be consolidated in a specific device (such as an application specific integrated circuit (ASIC)). The touch pressure control device 5000 can be divided into independent units, or can be implemented by combining the units. The touch pressure control device 5000 can be implemented by one or a combination of two or more of the above implementation ways.

Although some specific embodiments of the present disclosure have been demonstrated in detail with examples, it should be understood by a person skilled in the art that the above examples are only intended to be illustrative but not to limit the scope of the present disclosure. It should be understood by those skilled in the art that the above embodiments could be modified without departing from the scope and spirit of the present disclosure. The scope of the present disclosure is defined by the appended claims.

The invention claimed is:

1. A touch pressure control method performed by a processor configured with instructions and comprising the steps of:
    according to a first pressure value and a second pressure value generated in response to a single touch operation, determining a pressure level and a touch point position corresponding to the touch operation by the processor configured with the instructions; and
    according to the pressure level and the touch point position, selecting a corresponding function or application from a function and application list and controlling an implementation of the function or application by the processor configured with the instructions,
    wherein the step of, according to the first pressure value and the second pressure value generated in response to the single touch operation, determining the pressure level and the touch point position corresponding to the touch operation by the processor configured with the instructions, comprises:
    according to a sum of the first pressure value and the second pressure value, determining the pressure level corresponding to the touch operation by the processor configured with the instructions; and
    according to a ratio of the first pressure value to the second pressure value, determining the touch point position corresponding to the touch operation by the processor configured with the instructions.

2. The touch pressure control method according to claim 1, further comprising:
    determining a pressure duration corresponding to the touch operation by the processor configured with the instructions; and
    according to the pressure level, the touch point position and the pressure duration, selecting the corresponding function or application from the function and application list and controlling the implementation of the function or application by the processor configured with the instructions.

3. The touch pressure control method according to claim 1, further comprising:
    resetting the function and application list in response to an external setting request by the processor configured with the instructions.

4. The touch pressure control method according to claim 1, further comprising:
    acquiring the first pressure value generated in response to the touch operation by a first pressure sensor and the second pressure value generated in response to the touch operation by a second pressure sensor by the processor configured with the instructions.

5. A touch pressure control device, comprising a processor and memory for storing instructions, wherein the processor is configured with the instructions to implement the following units:
    a parameter determination unit configured to, according to a first pressure value and a second pressure value generated in response to a single touch operation, determine a pressure level and a touch point position corresponding to the touch operation; and
    a function control unit configured to, according to the pressure level and the touch point position, select a corresponding function or application from a function and application list, and control an implementation of the function or application,
    wherein the parameter determination unit at least comprises:
    a means configured to, according to a sum of the first pressure value and the second pressure value, determine to, according to a ratio of the first pressure value to the second pressure
    a means configured to, according to a ratio of the first pressure value to the second pressure value, determine the touch point position corresponding to the touch operation.

6. The touch pressure control device according to claim 5, wherein the parameter determination unit further comprises a means configured to determine a pressure duration corresponding to the touch operation; and
    the function control unit are is configured to, according to the pressure level, the touch point position and the pressure duration, select the corresponding function or application from the function and application list, and control the implementation of the function or application.

7. The touch pressure control device according to claim 5, wherein the processor is further configured with the instructions to implement the following unit:
    a means a reset unit configured to reset the function and application list in response to an external setting request.

8. The touch pressure control device according to claim 5, wherein the processor is further configured with the instructions to implement the following unit:

a means an acquirement unit configured to acquire the first pressure value generated in response to the touch operation by a first pressure sensor and the second pressure value generated in response to the touch operation by a second pressure sensor.

* * * * *